(12) United States Patent
Horn et al.

(10) Patent No.: US 8,601,130 B2
(45) Date of Patent: Dec. 3, 2013

(54) PROPAGATING SESSION STATE CHANGES TO NETWORK FUNCTIONS IN AN ACTIVE SET

(75) Inventors: Gavin Horn, La Jolla, CA (US); Fatih Ulupinar, San Diego, CA (US); Paul E. Bender, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 11/759,915

(22) Filed: Jun. 7, 2007

(65) Prior Publication Data

US 2007/0286206 A1 Dec. 13, 2007

Related U.S. Application Data

(60) Provisional application No. 60/811,876, filed on Jun. 7, 2006.

(51) Int. Cl.
*H04L 12/56* (2011.01)

(52) U.S. Cl.
USPC .......................................................... 709/227

(58) Field of Classification Search
USPC ......... 709/227, 228–229, 208–211, 217–219, 709/223, 225, 226; 455/436–444
See application file for complete search history.

(56) References Cited

U.S. PATENT DOCUMENTS

| | | | |
|---|---|---|---|
| 7,356,339 B2 | 4/2008 | Nam | |
| 7,546,124 B1 * | 6/2009 | Tenneti et al. | 455/436 |
| 7,577,661 B2 * | 8/2009 | Bankston et al. | 1/1 |
| 2002/0193110 A1 | 12/2002 | Julka et al. | |
| 2003/0135626 A1 * | 7/2003 | Ray et al. | 709/228 |
| 2005/0010635 A1 * | 1/2005 | Schwesig et al. | 709/203 |
| 2005/0207368 A1 * | 9/2005 | Nam | 370/320 |
| 2005/0207668 A1 | 9/2005 | Perchant et al. | |
| 2005/0266847 A1 | 12/2005 | Tinnakornsrisuphap et al. | |
| 2005/0286470 A1 | 12/2005 | Asthana et al. | |
| 2006/0046762 A1 * | 3/2006 | Yoon et al. | 455/519 |
| 2006/0099950 A1 * | 5/2006 | Klein et al. | 455/439 |
| 2006/0104232 A1 * | 5/2006 | Gidwani | 370/328 |

FOREIGN PATENT DOCUMENTS

| | | |
|---|---|---|
| EP | 1533957 | 5/2005 |
| EP | 1655985 | 5/2006 |
| JP | 2003234759 A | 8/2003 |
| RU | 2267223 | 12/2005 |
| WO | WO2005115026 | 12/2005 |

OTHER PUBLICATIONS

International Search Report—PCT/US07/070627, International Search Authority—European Patent Office—Dec. 7, 2007.
Taiwanese Search report—096120630—TIPO—Aug. 10, 2010.
Written Opinion—PCT/US2007/070627, International Search Authority, European Patent Office, Dec. 7, 2007.

* cited by examiner

*Primary Examiner* — Ruolei Zong
(74) *Attorney, Agent, or Firm* — Michael J. DeHaemer, Jr.

(57) ABSTRACT

A network function is configured to maintain a copy of a session state for an access terminal. The network function is further configured to query a session master to determine whether the session state has changed. The session master is configured to generate a response to the query that enables the network function to update the copy of the session state if the session state has changed. The access terminal may be configured to change the session state at a first network function and send a message to a second network function to indicate that the session state has been changed.

55 Claims, 6 Drawing Sheets

PROPAGATING SESSION STATE CHANGES TO NETWORK FUNCTIONS IN AN ACTIVE SET

RELATED APPLICATIONS

The present application claims the benefit of U.S. Provisional Patent Application Ser. No. 60/811,876 filed on Jun. 7, 2006, titled "A METHOD AND APPARATUS FOR UPDATING THE SESSION STATE" which is hereby expressly incorporated by reference.

BACKGROUND

1. Field

The present disclosure relates generally to wireless communication networks, and more particularly, to various concepts and techniques for propagating session state changes to network functions in an active set.

2. Background

Wireless communication systems are widely deployed to provide various communication services such as telephony, video, data, messaging, broadcasts, and so on. These systems commonly employ an access network capable of connecting multiple access terminals to a wide area network (WAN) by sharing the available network resources. The access network is generally implemented with multiple access points dispersed throughout a geographic coverage region. The geographic coverage region is generally divided into cells with an access point in each cell. The cell may be further divided into sectors. The access point generally includes one transceiver function for each sector in the cell. The transceiver function provides an air interface attachment point for access terminals in the sector.

The access network may also include one or more network functions. In a typical configuration, the network function acts as a controller for any number of transceiver functions and performs various tasks including allocating, managing and tearing down resources for the access terminals. The network function also provides an Internet Protocol (IP) layer attachment point (IAP) for the access terminals. All IP packets destined for the access terminal are sent via the IAP. The access network may have a centralized network architecture defined here as multiple network functions supporting multiple access points, i.e., each network function supporting multiple access points and each access point supported by multiple network functions, or a distributed network architecture defined here as dedicated network function for each access point, i.e., each network function supports a single access point and each access point is supported by a single network function.

In addition to providing an IP layer attachment point, the IAP may also responsible maintaining a session state for any number of access terminals. The session state for an access terminal is the state of the access network on the control path between the access terminal and the IAP that is preserved when a connection is closed. The session state includes the value of the attributes that are negotiated between the access terminal and the access network. These attributes affect the characteristics of the connection and the service received by the access terminal. By way of example, an access terminal may negotiate the quality of service (QoS) configuration for a new application and supply new filter and flow specifications to the access network indicating the QoS service requirements for the application. As another example, the access terminal may negotiate the size and type of the headers used in communication with the access network.

In some wireless communication systems, an access terminal in a given sector establishes a connection with an access point by making an access attempt on an access channel of a transceiver function serving that sector. The network function associated with the transceiver function receiving the access attempt contacts the session master for the access terminal and retrieves a copy of the access terminal's session state. The session master could be a centralized or distributed entity and may or may not be colocated with the IAP. On a successful access attempt, the access terminal is assigned air interface resources such as a MAC ID and data channels to communicate with the transceiver function serving the sector. In addition, the IAP is moved to the serving network function, or alternatively, an IP tunneling protocol is used to send IP packets between the IAP and the serving network function.

In some wireless communication systems, once the access terminal establishes a connection with an access point, it sends a report indicating the other sectors that it can hear and their signal strength. The transceiver function receives the report and forwards it to a centralized network based controller in the network function, which in turn provides the access terminal with an active set. The active set is a set of sectors that have reserved air interface resources for the access terminal. The access terminal will continue to send periodic reports and the network based controller may add or remove sectors from the active set as the access terminal moves around the access network.

One function of the active set is to allow the access terminal to quickly switch between sectors and maintain service without having to make a new access attempt. This is achieved by (1) reserving air interface resources for the access terminal in each of the sectors in the active set, and (2) providing a copy of the session state from the session master to each network function serving a sector in the active set. With this approach, the handoff between the sectors can be achieved while minimizing the affect on the QoS service of active applications.

When the session state is changed at the session master, the new attributes need to be distributed to each network function serving a sector in the active set in a timely manner to ensure optimal service from each sector. In some cases, for example if the type of headers changes, or new security keys are negotiated, an access terminal may not be able to communicate at all with a sector until these changes are propagated to that sector. Thus, whenever there is a change to the session state, the network based controller needs to push the changes out to each network function serving a sector in the active set.

As an alternative to the traditional network based controller, the access terminal may be responsible for maintaining the active set. With the access terminal performing this function, there is no single entity in the access network that knows all of the network functions for the sectors in the active set. Accordingly, there is a need in the art for a mechanism to update the copy of the session state at each network function serving a sector in the active set when a session change occurs.

SUMMARY

In accordance with one aspect of the disclosure, an apparatus for operation in an access network includes a processing system configured to maintain a copy of a session state for an access terminal, the processing system being further configured to query a session master to determine whether the session state has changed, and update the copy of the session state if the session state has changed.

In accordance with another aspect of the disclosure, an apparatus for operation in an access network includes a processing system configured to function as a session master by maintaining a session state for an access terminal, the processing system being further configured to generate a response to a query from a network function, the response enabling the network function to update a copy of the session state maintained by the network function for the access terminal.

In accordance with a further aspect of the disclosure, an apparatus for accessing an access network includes a processing system configured to maintain an active set comprising sectors served by first and second network functions, each of the network functions maintaining a copy of a session state for the apparatus, and wherein the processing system is further configured to change the session state at a first network function and send a message to the second network function to indicate that the session state has been changed.

In accordance with yet a further aspect of the disclosure, a method of operating in an access network includes maintaining a copy of a session state for an access terminal, querying a session master to determine whether the session state has changed, and updating the copy of the session state if the session state has changed.

In accordance with still yet a further aspect of the disclosure, a method of operating in an access network includes functioning as a session master by maintaining a session state for an access terminal; generating a response to a query from a network function, the response enabling the network function to update a copy of the session state maintained by the network function for the access terminal.

In accordance with another aspect of the disclosure, a method of communicating with an access network on an apparatus includes maintaining an active set comprising sectors served by first and second network functions, each of the network functions maintaining a copy of a session state for the apparatus, changing the session state at the first network function, and sending a message to the second network function to indicate that the session state has been changed.

In accordance with yet another aspect of the disclosure, a machine-readable medium comprises instructions executable by one or more processors in an apparatus, the instructions include code to maintain a copy of a session state for an access terminal, code to query a session master to determine whether the session state has changed, and code to update the copy of the session state if the session state has changed.

In accordance with still yet another aspect of the disclosure, a machine-readable medium comprises instructions executable by one or more processors in an apparatus, the instructions including code to function as a session master by maintaining a session state for an access terminal, code to generate a response to a query from a network function, the response enabling the network function to update a copy of the session state maintained by the network function for the access terminal.

In accordance with a further aspect of the disclosure, a machine-readable medium comprises instructions executable by one or more processors in an apparatus, the instructions including code to maintain an active set comprising sectors served by first and second network functions, each of the network functions maintaining a copy of a session state for the apparatus, code to change the session state at the first network function, and code to send a message to the second network function to indicate that the session state has been changed.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The various concepts presented throughout this disclosure may be utilized across a broad array of communication systems. By way of example, a wireless communications system based on Ultra Mobile Broadband (UMB) could benefit from these concepts. UMB is an air interface standard promulgated by the 3GPP2, as part of the CDMA2000 family of standards. UMB is typically employed to provide Internet access to mobile subscribers. Another example of a wireless communications system that could benefit from these techniques is a system based on IEEE 802.20. IEEE 802.20 is a packet-based air interface designed for Internet Protocol (IP) based services. For clarity of presentation, various concepts will now be presented with reference to a distributed network architecture, however, these concepts are equally applicable to a centralized network architecture and may be readily be extended to other wireless communication systems.

Figure 1:
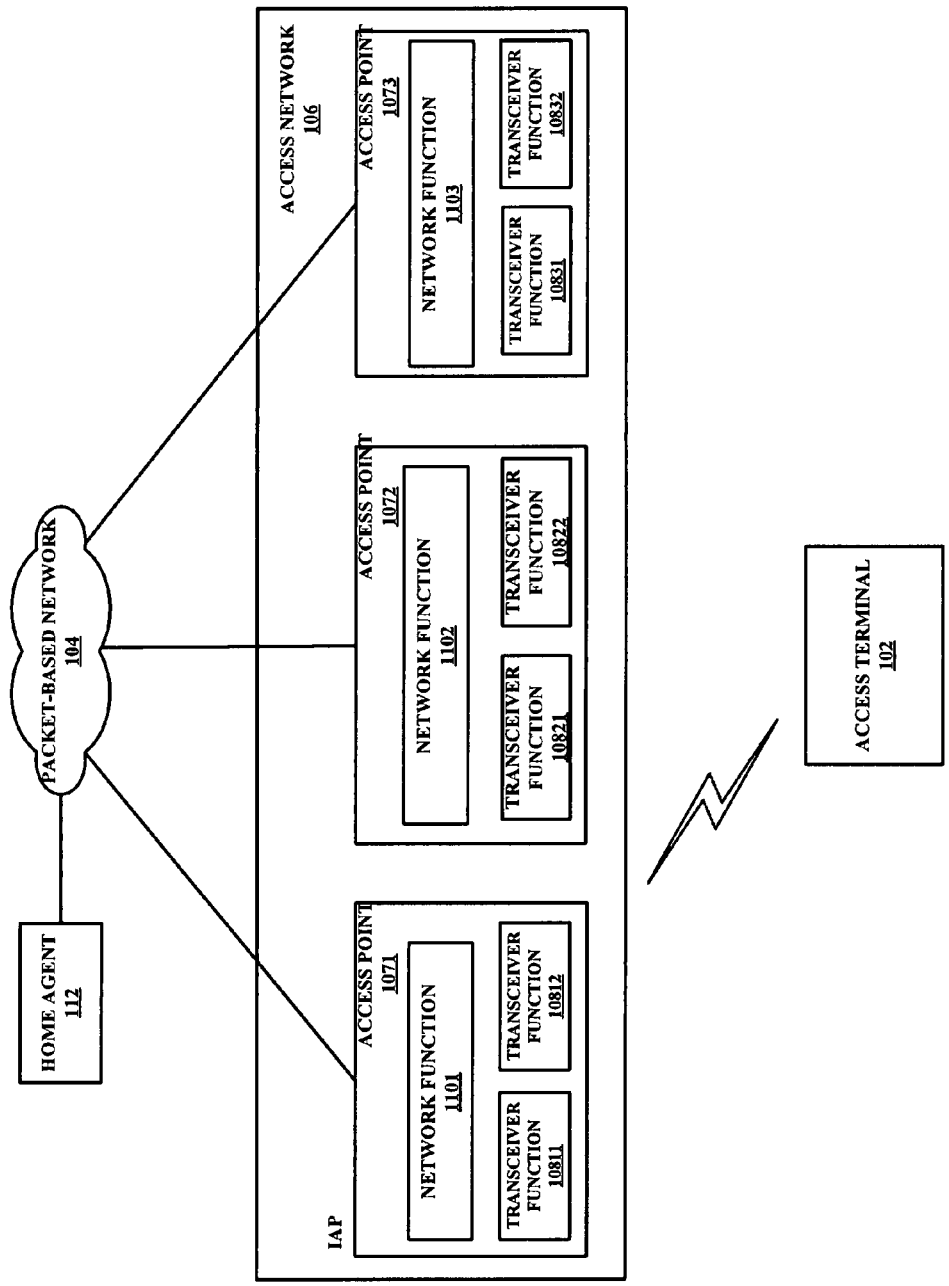
FIG. 1 is a conceptual block diagram of illustrating a distributed access network architecture including an access terminal.

FIG. 1 is a conceptual block diagram illustrating a distributed access network architecture including an access terminal. An access terminal 102 is shown connected to packet-based network 104, such as the Internet, through an access network 106. The access terminal 102 may be a fixed or mobile device in which a user can obtain service from the access network 106. By way of example, the access terminal 102 may be a cellular phone, a personal digital assistant (PDA), a personal computer, a laptop computer, a digital camera, a digital camcorder, a game console, an audio device, a video device, a multimedia device, or any other suitable device capable of receiving service from the access network 106.

The access network 106 includes multiple access points 107₁-107₃ dispersed throughout a cellular coverage region with an access point located in each cell. The access point 107 includes a separate transceiver function 108 for each sector in the cell that it is serving. The transceiver function 108 is used to provide an air interface attachment point for access terminals in its sector. In this example, the air interface attachment point for the access terminal 102 shown in FIG. 1 is the transceiver function 108₁₂. This transceiver function 108₁₂ is referred to as the serving transceiver function.

Each access point 107 also includes a network function 110. The network function 110 is responsible for controlling the transceiver functions 108 in the access point 107 and performs tasks like allocating, managing and tearing down resources for an access terminal. In this example, the network function 110₁ is the serving network function because it controls the transceiver function 108₁₂ that serves as the air interface attachment point for the access terminal 102. The serving network function 110₁ may provide the IAP for the access terminal 102. Alternatively, the IAP may be located elsewhere and an IP tunneling protocol may be used to send packets between the IAP and the serving network function 110₁. A home agent 112, responsible for maintaining a connection over the packet-based network 104, exchanges IP packets with the access terminal 102 through the IAP.

As the radio conditions change, the access terminal 102 may change its air interface attachment point to a new sector in the active set. The process of changing the air interface attachment point is often referred to as a "L2 handoff" because it constitutes a handoff of the access terminal 102 at the link layer. The access terminal 102 performs filtered measurements on the radio conditions for the forward and reverse links for all sectors in the active set. By way of example, in a UMB based communications system, the access terminal 102 can measure the signal-to-interference noise ratio (SINR) on the acquisition pilots, the common pilot channel (if present), and the pilots on the shared signaling channel to select the forward link sector. For the reverse link, the access terminal 102 can measure the CQI erasure rate for each sector in the active set based on the up/down power control commands to the access terminal 102 from the sector.

When the access terminal 102 changes its air interface attachment point, the IAP may be moved to the network function serving the new transceiver function. The process of changing the IAP is often referred to as a "L3 handoff" because it constitutes a handoff of the access terminal 102 at the network layer. A L3 handoff requires a home agent binding update with the new IAP and requires a transfer of the session state to the new IAP. As an alternative to a L3 handoff, an IP tunneling protocol may be used to send packets between the IAP and the serving network function.

As explained in the background portion of this disclosure, the use of the active set allows an access terminal to quickly switch between sectors and maintain service without having to make a new access attempt by (1) reserving air interface resources for the access terminal in each of the sectors in the active set, and (2) providing a copy of the session state to each network function serving a sector in the active set.

An example will now be presented with reference to FIG. 1. When the access terminal 102 establishes an active connection with a serving transceiver function 108₁₂, it will begin to create an active set. In this example, the signal strength from the other transceiver function 108₁₁ in the serving access point 107₁, as well as the transceiver functions 108₂₁, 108₂₂ in the neighboring access point 107₂, should be sufficient to add the sectors served by these transceiver functions to the active set. The access terminal 102 adds the sectors to the active set by sending a connection request to the network functions 110₁ and 110₂. In response to the connection request, the network functions 110₁, 110₂ reserve air interface resources for the access terminal in these sectors. The network function 110₂ in the neighboring access point 107₂ also retrieves a copy of the session state from the session master for the access terminal 102. In this example, the IAP is the session master and the serving network function 110₁.

Figure 2:
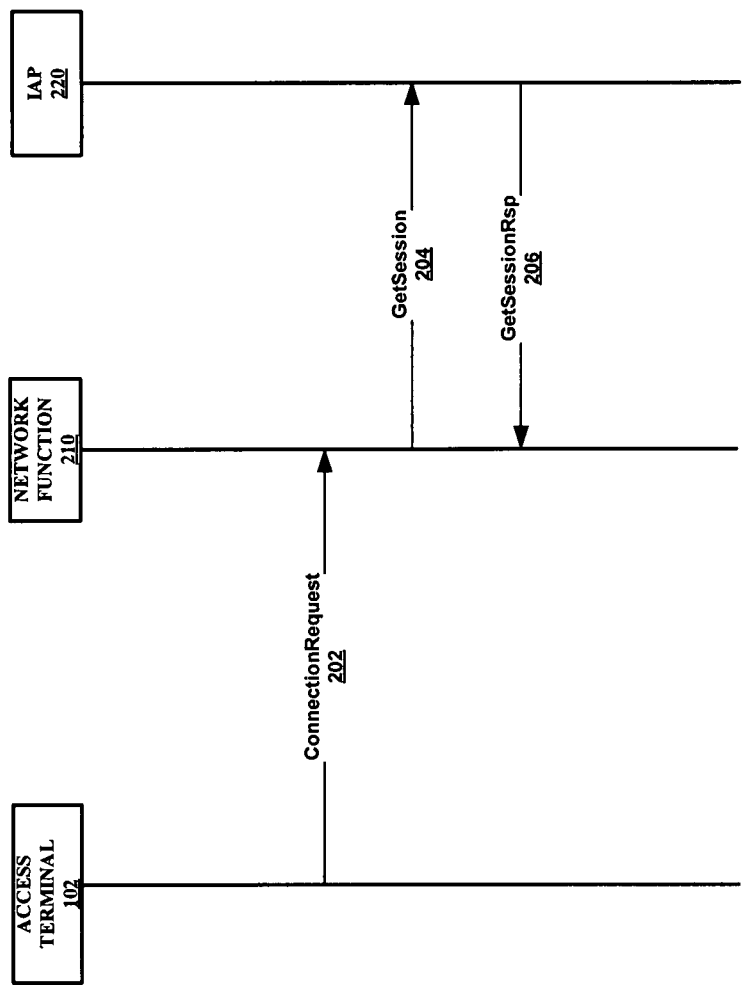
FIG. 2 is a diagram illustrating an example of a call flow for adding a sector to the active set.

FIG. 2 is a call flow diagram illustrating an example of a call flow for adding a sector to the active set. In step 202, the access terminal 102 sends a connection request to a network function 210 controlling the sector being added to the active set. The connection request includes an identifier for the session master 220 for the access terminal 102. The identifier may be a unicast access terminal identifier (UATI), which may be used as an IP address to directly address the session master 220, or may be used to look up the address of the session master 220. In step 204, the network function 210 pulls a copy of the session state from the session master 220 when it joins the active set by sending a "get session" message to the session master 220. The session master 220 responds with a "get session" response that includes the attributes for the session state.

When the access terminal 102 reconfigures or changes the session state at the session master, the copy of the session state maintained by each network function serving a sector in the active set needs to be updated. Several techniques may be used. Two examples will be presented for updating the copies of the session state at the various network functions, however, the invention is not limited to these techniques. Other techniques will be readily apparent to those skilled in the art from the teachings throughout this disclosure.

One technique will be referred to as an access terminal (AT) pushed-based mechanism. With this technique, the access terminal sends a message to each network function serving a sector in the active set requiring it to update its copy of the session state. In response to this message, the network function queries the session master to determine whether the session state has changed. If the session state at the session master has changed, the network function updates its session state accordingly.

Figure 3:
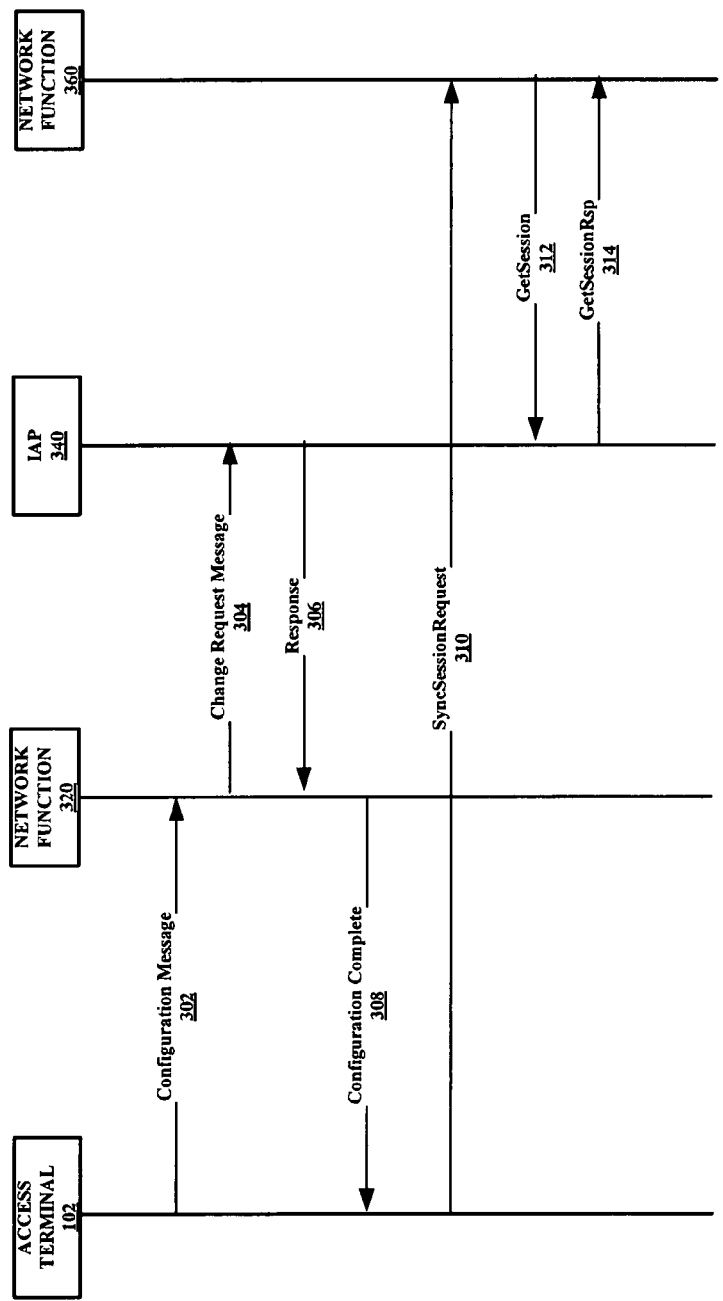
FIG. 3 is a diagram illustrating an example of a call flow for changing the session state.

FIG. 3 is a call flow diagram illustrating an example of an AT pushed-based mechanism. In this example, a serving network function 320 has an IP tunnel to a session master 340 for the access terminal. A second network function 360 serves a sector that is in the active set of the access terminal 102.

Referring to FIG. 3, the access terminal 102 reconfigures or changes the session state by sending a configuration message to the serving network function 320 in step 302. In response to this message, the serving network function 320 sends a change request message to the session master 340 in step 304. The session master 340 changes the session state and then sends a response back to the serving network function 320, in step 306, indicating that the session state has been changed. In step 308, the serving network function 320 sends a configuration complete message to the access terminal 102. Once this occurs, the access terminal 102, in step 310, sends a "synch session" request to each network function serving a sector in the active set, requiring it to update its copy of the session state. In this example, the "synch session" request is sent to the second network function 360. In step 314, the second network function 360 uses the UATI acquired when it was added to the active set to query the session master 340 with a "get session" message. The session master 340 responds in step 316 with a "get session" response that includes the attributes of the session state.

Another technique for updating the copies of the session state at various network functions will be referred to as a timer-based mechanism. With the time-based mechanism, each network function serving a sector in the active set periodically queries the session master for the access terminal to determine whether the session state has changed. A "get session request" message may be used to query the session master and a "get session response" may be used to forward the attributes of the session state from the session master to the network functions.

In addition to the AT push-based and timer-based mechanisms, a network function can also query the session master to determine whether there has been a change to the session state when one of its sectors becomes a serving sector for the access terminal.

The "get session request" from a network function to a session master may include a signature that indicates the last copy of the session state that it received. The signature may be a common hash function computed over one or more of the attribute values. The session master generates its own signature by computing the hash function over the same set of attributes for the current session state and compares it with the signature for each "get session request" it receives from a network function. The attribute values for the session state is sent to the network function in response to a "get session request" message only when the signatures do not match (i.e., the signature of the network function is different from the computed signature at the session master). Alternatively, a time stamp or a counter that is incremented every time a copy of the session state is updated may be used as the signature. The signature, regardless of the manner in which it is generated, may also be used with the other signaling messages. The signatures may be nulled during the initial signaling.

There are a number of ways that the session state may be reconfigured or changed at the session master. One example will be referred to as a "default locked" approach. With this approach, the session state at the session master is locked at all times and needs to be unlocked to reconfigure or change the attributes. The session state is unlocked with an exchange of messages that starts the process and locked with an exchange of massages that ends the process. By way of example, the session state at the session master may be unlocked by the "synch session request" from the access terminal in the AT push-based mechanism and locked when the "get session response" is sent from the IAP.

Another example may be referred to as a "default unlocked" approach. With this approach, the session state may be reconfigured or changed at any time. However, the session state usually needs to be locked for a session state handoff (i.e., the transfer of the session state to a new session master).

Figure 4:
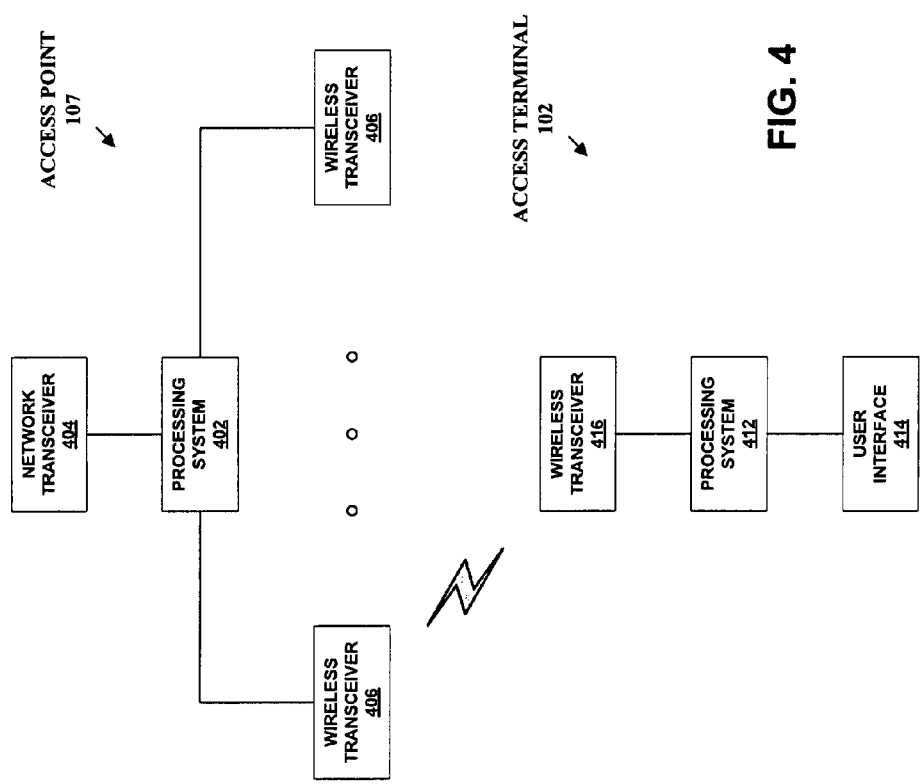
FIG. 4 is a conceptual block diagram illustrating an example of the hardware configuration for an access point and access terminal.

FIG. 4 is a conceptual block diagram illustrating an example of the hardware configuration for an access point and access terminal. In this example, the access point 107 is shown with a processing system 402, a network transceiver 404, and a wireless transceiver 406 for each sector of a cell. Each wireless transceiver 406 is used to implement the analog portion of the physical layer for the transceiver function by demodulating wireless signals and performing other RF front end processing. The processing system 402 is used to implement the digital processing portion of the physical layer, as well as implement the link layer, for the transceiver function. The processing system 402 also provides the network function in the access point 107. The network transceiver 404 provides an interface between the network function in the processing system 402 and the backhaul for the access network.

The access terminal 102 is shown with a processing system 412, a user interface 414, and a wireless transceiver 416. Much like the wireless transceivers 406 in the access point 107, the wireless transceiver 416 is used to implement the analog portion of the physical layer for the access terminal 102 by demodulating wireless signals and performing other RF front end processing. The processing system 412 is used to implement the digital processing portion of the physical layer, the link layer, the network layer, and all upper layer functions. A user interface 414 is provided to allow the user to operate the access terminal 102, and may include, by way of example, a display and keypad.

The processing system 402, 412 in the access point 107 and the access terminal 102 may be implemented with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuits (ASIC), a programmable logic device (PLD), a field programmable gate array (FPGA), a controller, a micro-controller, a state machine, or a combination of discrete hardware components, or any combination thereof. The processing system 402, 412 may also include a machine readable medium for storing software executed by the one or more processors. The machine readable medium may include one or more storage devices that are implemented, either in whole or part, within the processing system 402, 412. The machine readable medium may also include one or more storage devices remote to the processing system 402, 412 or be embodied by a transmission line or a carrier wave that encodes a data signal. Those skilled in the art will recognize how best to implement the described functionality for the processing system 402, 412.

Figure 5:
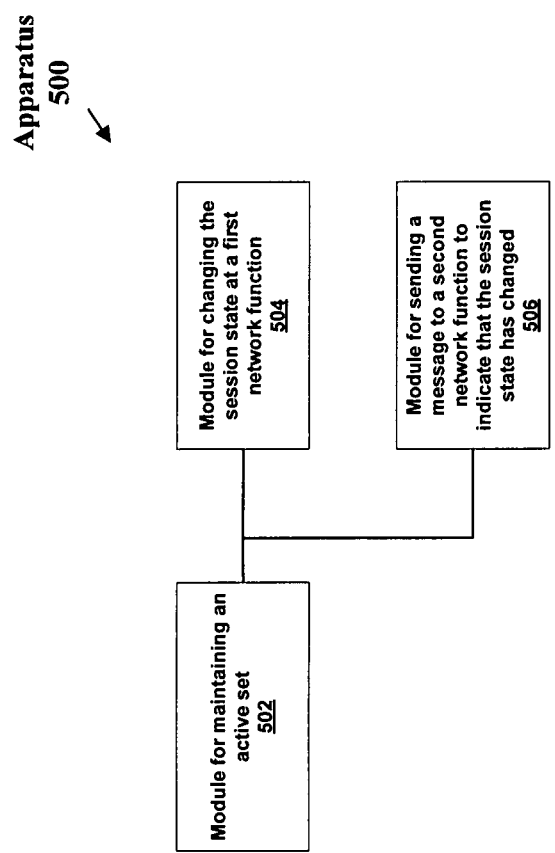
FIG. 5 is a block diagram illustrating an example of the functionality of a processing system in an apparatus for accessing an access network.

FIG. 5 is a block diagram illustrating an example of the functionality of a processing system in an apparatus for accessing an access network. The apparatus 500 may be an access terminal or other entity. The apparatus 500 includes a module 502 for maintaining an active set. The active set in this example includes sectors served by first and second network functions, each of the network functions maintaining a copy of a session state for the apparatus. The apparatus 500 also includes a module 504 for changing the session state at the first network function, and a module 506 for sending a message to the second network function to indicate that the session state has been changed.

Figure 6A:
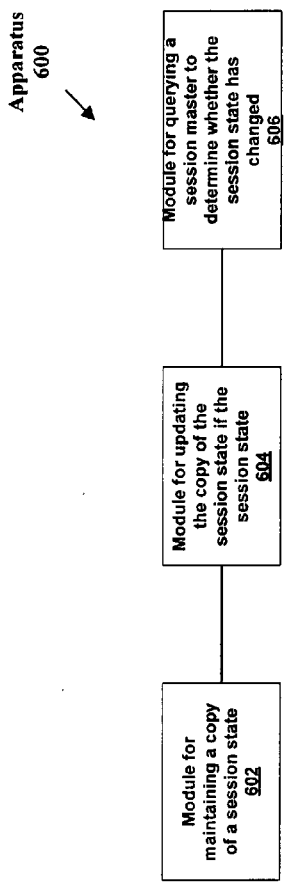
FIGS. 6A and 6B are block diagrams illustrating an example of the functionality of a processing system in an apparatus for operation in an access network.
Figure 6B:
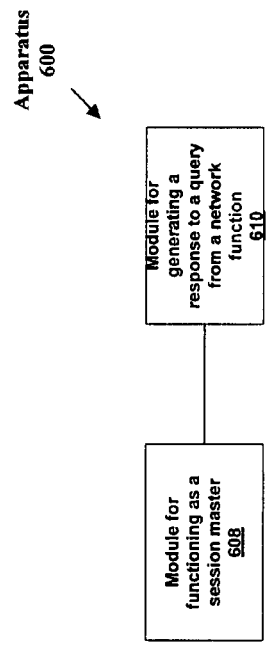

FIGS. 6A and 6B are block diagrams illustrating an example of the functionality of a processing system in an apparatus for operation in an access network. The apparatus 600 may be a network function or other entity. Referring to FIG. 6A, the apparatus 600 includes a module 602 for maintaining a copy of a session state for an access terminal, a module 606 for querying a session master to determine whether the session state has changed, and a module 604 for updating the copy of the session state if the session state has changed.

The apparatus 600 may also serve as a session master. Referring to FIG. 6B, the apparatus includes a module 608 for functioning as a session master by maintaining a session state for an access terminal, and a module 610 for generating a response to a query from a network function, the response enabling the network function to update a copy of the session state maintained by the network function for the access terminal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for operation in an access network, comprising a transceiver configured to provide an air interface attachment point for an access terminal in a second sector of a wireless network, and a processing system configured to:
   maintain a copy of a session state for the access terminal, wherein the access terminal is responsible for maintaining an active set of sectors, the active set corresponding to a plurality of network functions that maintain copies of the session state;
   query a session master to determine whether the session state has changed, wherein the session master maintains session state for the access terminal;
   update the copy of the session state if the session state has changed; and
   provide a second network function configured to serve the access terminal in the second sector of the wireless network,
   wherein a first network function serves the access terminal in a first sector of the wireless network.

2. The apparatus of claim 1 wherein the query by the processing system is timer based.

3. The apparatus of claim 1 wherein the query by the processing system is in response to a message received from the access terminal.

4. The apparatus of claim 1 wherein the session state comprises a plurality of attributes for communicating with the access terminal, each of the attributes having a value.

5. The apparatus of claim 4 wherein the processing system is further configured to query the session master by sending to the session master a signature to indicate the last received copy of the session state, the processing system being further configured to compute a hash function over one or more of the attribute values, and wherein the signature comprises the hash function.

6. The apparatus of claim 1 wherein the processing system is further configured to query the session master by sending to the session master a signature to indicate the last received copy of the session state.

7. The apparatus of claim 6 wherein the signature comprises a time stamp.

8. The apparatus of claim 6 wherein the signature comprises a count generated by a counter, wherein the counter is incremented each time the session state is updated at the session master.

9. The apparatus of claim 1 wherein the processing system is further configured to change session state at the session master.

10. The apparatus of claim 9 wherein the processing system is further configured to change the session state at the session master in response to a message received from the access terminal.

11. An apparatus for operation in an access network, comprising:
    a processing system configured to function as a session master by maintaining a session state for an access terminal, the processing system providing a first network function with an updated session state, the first network function serving the access terminal in a first sector of an active set of sectors,
    the processing system being further configured to generate a response to a query from a second network function serving a second sector in the active set, the response enabling the second network function to update a copy of the session state maintained by the second network function for the access terminal, wherein the access terminal is responsible for maintaining the active set.

12. The apparatus of claim 11 wherein the session state comprises a plurality of attributes for communicating with the access terminal, each of the attributes having a value.

13. The apparatus of claim 12 wherein the query from the second network function comprises a signature to indicate the last received copy of the session state at the second network function, the signature comprising a hash function computed over one or more of the attribute values.

14. The apparatus of claim 11 wherein the query from the second network function comprises a signature to indicate the last received copy of the session state at the second network function.

15. The apparatus of claim 14 wherein the processing system is further configured to determine, based on the signature, whether the copy of the session state at the second network function is current, and wherein the response generated by the processing system is a function of whether the copy of the session state at the second network function is current.

16. The apparatus of claim 14 wherein the signature comprises a time stamp.

17. The apparatus of claim 14 wherein the signature comprises a count generated by a counter in the second network function, the counter being incremented each time the copy of the session state at the session master is updated.

18. The apparatus of claim 11 wherein the processing system is further configured to change the session state in response to a received message.

19. The apparatus of claim 18 wherein the processing system is further configured to unlock the session state in response to the received message to change the session state and lock the session state once the change is completed.

20. An apparatus for accessing an access network, comprising:
    a processing system configured to maintain an active set comprising sectors served by first and second network functions, each of the network functions maintaining a copy of a session state for the apparatus, and wherein the processing system is further configured to change the session state at the first network function and send a message to the second network function to indicate that the session state has been changed, wherein the first network function is configured to serve an access terminal in a first sector of a wireless network and the second network function is configured to serve the access terminal in a second sector of the wireless network.

21. The apparatus of claim 20 wherein the first network function is the session master.

22. The apparatus of claim 20 wherein the second network function is the session master, and wherein the processing system is further configured to change the session state at the session master through the first network function.

23. The apparatus of claim 20 wherein the session state comprises a plurality of attributes for communicating with the apparatus, each of the attributes having a value.

24. The apparatus of claim 20 wherein the processing system is further configured to initiate the change to the session state at the first network function.

25. The apparatus of claim 20 wherein the processing system is further configured to change the session state in response to a message from the first network function.

26. The apparatus of claim 25 wherein the message sent to the second network function includes a signature comprising a hash function computed over one or more of the attribute values.

27. The apparatus of claim 20 wherein the message sent to the second network function includes a signature.

28. The apparatus of claim 27 wherein the signature comprises a time stamp.

29. The apparatus of claim 27 wherein the signature comprises a count generated by a counter, the counter being incremented each time the session state at the session master is changed.

30. An apparatus for operation in an access network, comprising:
   means for providing an air interface attachment point for an access terminal in a second sector of a wireless network;
   means for maintaining a copy of a session state for the access terminal, wherein the access terminal is responsible for maintaining an active set of sectors, the active set corresponding to a plurality of network functions that maintain copies of the session state;
   means for querying a session master to determine whether the session state has changed, wherein the session master maintains session state for the access terminal;
   means for updating the copy of the session state if the session state has changed; and
   second network function means for serving a second sector in the wireless network, wherein the second network function means is configured to use the updated copy of the session state in connection with a handoff with respect to the access terminal from the first to the second sector.

31. An apparatus for operation in an access network, comprising:
   means for functioning as a session master by maintaining a session state for an access terminal;
   means for providing a first network function with an updated session state, the first network function serving the access terminal in a first sector of an active set of sectors; and
   means for generating a response to a query from a second network function serving a second sector in the active set, the response enabling the second network function to update a copy of the session state maintained by the second network function for the access terminal, wherein the access terminal is responsible for maintaining the active set.

32. An apparatus for accessing an access network, comprising:
   means for maintaining an active set comprising sectors served by first and second network functions, each of the network functions maintaining a copy of a session state for the apparatus;
   means for changing the session state at the first network function; and
   means for sending a message to the second network function to indicate that the session state has been changed.
   wherein the first network function is configured to serve an access terminal in a first sector of a wireless network and the second network function is configured to serve the access terminal in a second sector of the wireless network.

33. A method of facilitating handoff with respect to a wireless access terminal from first to second sectors of an active set of sectors in an access network, the access network having first and second network functions serving the first and second sectors, respectively, the method comprising:
   maintaining, at the second network function, a copy of a session state for the access terminal;
   querying a session master to determine whether the session state has changed;
   updating, at the second network function, the copy of the session state if the session state has changed; and
   using the updated session state at the second network function in connection with the handoff from the first to second sectors, wherein the access terminal is responsible for maintaining the active set, the active set identifies a plurality of network functions that maintain copies of the session state.

34. The method of claim 33 wherein the query of the session master is timer based.

35. The method of claim 33 wherein the query of the session master is responsive to a message received from the access terminal.

36. The method of claim 33 wherein the query of the session master comprises sending to the session master a signature to indicate the last received copy of the session state.

37. A method of facilitating handoff with respect to an access terminal from first to second sectors of an active set of sectors in an access network, the access network having first and second network functions serving the first and second sectors, respectively, the method comprising:
   functioning as a session master by maintaining a session state for an access terminal;
   generating a response to a query from the second network function, the response enabling the second network function to update a copy of the session state maintained by the second network function for the access terminal; and
   using the updated copy of the session state by the second network function in connection with the handoff from the first to second sectors, wherein the access terminal is responsible for maintaining the active set.

38. The method of claim 37 wherein the query from the second network function comprises a signature to indicate the last received copy of the session state at the second network function.

39. The method of claim 37 further comprising unlocking the session state in response to a received message to change the session state and locking the session state once the change is completed.

40. A method used on an apparatus, for communicating with an access network, the access network having first and second network functions, the method comprising:
- maintaining an active set comprising sectors served by the first and second network functions, each of the network functions maintaining a copy of a session state for the apparatus;
- changing the session state at the first network function; and
- sending a message to the second network function to indicate that the session state has been changed, wherein the first and second network functions are configured to provide service in first and second sectors of a wireless network, respectively.

41. The method of claim 40 wherein the message sent to the second network function includes a signature.

42. The apparatus of claim 1, wherein the first network function is part of a first access point, and the second network function is a part of a second access point.

43. The apparatus of claim 11, wherein the first network function is part of a first access point, and the second network function is a part of a second access point.

44. The apparatus of claim 20, wherein the first network function is part of a first access point, and the second network function is a part of a second access point.

45. The method of claim 33, wherein the first network function is part of a first access point, and the second network function is a part of a second access point.

46. The method of claim 37, wherein the first network function is part of a first access point, and the second network function is a part of a second access point.

47. The method of claim 40, wherein the first network function is part of a first access point, and the second network function is a part of a second access point.

48. The apparatus of claim 1, wherein each of the plurality of network functions that maintain copies of the session state reserve air interface resources for the access terminal.

49. The apparatus of claim 11, wherein the first and second network functions reserve air interface resources for the access terminal.

50. The apparatus of claim 20, wherein both the first and second network functions reserve air interface resources for the access terminal.

51. The apparatus of claim 30, wherein each of the plurality of network functions reserves air interface resources for the access terminal.

52. The apparatus of claim 31, wherein the first and second network functions reserve air interface resources for the access terminal.

53. The apparatus of claim 32, wherein the first and second network functions reserve air interface resources for the access terminal.

54. The apparatus of claim 37, wherein each of the first and second network functions reserves air interface resources for the access terminal.

55. The apparatus of claim 40, wherein each of the first and second network functions reserves air interface resources for the access terminal.

* * * * *